(12) United States Patent
Witkin et al.

(10) Patent No.: US 10,332,049 B2
(45) Date of Patent: Jun. 25, 2019

(54) METHOD AND APPARATUS FOR DETERMINING A REGENERATION RATE FOR A BREADCRUMB

(71) Applicant: MOTOROLA SOLUTIONS, INC, Schaumburg, IL (US)

(72) Inventors: Catherine S Witkin, New York, NY (US); Esha Bhargava, Astoria, NY (US); Jeffrey N Hirsch, Stony Point, NY (US); Alexander R Spiro, Astoria, NY (US)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 466 days.

(21) Appl. No.: 15/057,173

(22) Filed: Mar. 1, 2016

(65) Prior Publication Data

US 2017/0255894 A1   Sep. 7, 2017

(51) Int. Cl.
*G06Q 30/00*   (2012.01)
*G06Q 10/06*   (2012.01)
*G06Q 40/00*   (2012.01)
*G06Q 30/02*   (2012.01)
*G06Q 30/06*   (2012.01)
*G06Q 10/10*   (2012.01)

(52) U.S. Cl.
CPC ... *G06Q 10/063114* (2013.01); *G06Q 10/067* (2013.01); *G06Q 10/06315* (2013.01); *G06Q 10/103* (2013.01); *G06Q 10/105* (2013.01); *G06Q 30/00* (2013.01); *G06Q 30/02* (2013.01); *G06Q 30/0235* (2013.01); *G06Q 30/0255* (2013.01); *G06Q 30/06* (2013.01); *G06Q 40/00* (2013.01)

(58) Field of Classification Search
CPC ........... G06Q 30/0255; G06Q 30/0235; G06Q 10/105; G06Q 10/103; G06Q 10/067; G06Q 30/02; G06Q 10/06315; G06Q 40/00; G06Q 30/00; G06Q 30/06; H04Q 7/20

See application file for complete search history.

(56) References Cited

U.S. PATENT DOCUMENTS

| | | | |
|---|---|---|---|
| 8,723,679 B2 | 5/2014 | Whisenant | |
| 2006/0158329 A1* | 7/2006 | Burkley | H04W 4/90 340/539.13 |
| 2009/0198641 A1* | 8/2009 | Tortoriello | G06N 7/02 706/52 |
| 2012/0089920 A1* | 4/2012 | Eick | G08G 1/20 715/739 |
| 2013/0325338 A1* | 12/2013 | Dong | G01C 21/3453 701/527 |
| 2014/0304115 A1 | 10/2014 | Kilmar et al. | |
| 2017/0314944 A1* | 11/2017 | Konig | G01C 21/3415 |

OTHER PUBLICATIONS

Adel S. Elmaghraby, et al. Cyber security challenges in Smart Cities: Safety, security and privacy. Journal of Advanced Research; vol. 5, Issue 4, Jul. 2014; pp. 491-497 (Year: 2014).*

* cited by examiner

*Primary Examiner* — Mehmet Yesildag
*Assistant Examiner* — Uche Byrd (57) ABSTRACT

A method and apparatus for providing an incentive to an officer to travel through a particular area is provide herein. During operation a device will provide an officer with a map of their patrol area. Along with the map, various roads and/or paths will have "breadcrumbs" shown on them. These breadcrumbs will be "picked up" (disappear) when an officer travels over them.

9 Claims, 6 Drawing Sheets

METHOD AND APPARATUS FOR DETERMINING A REGENERATION RATE FOR A BREADCRUMB

RELATED APPLICATIONS

The present invention is related to patent application Ser. No. 15/057193, entitled METHOD AND APPARATUS FOR PROVIDING AN INCENTIVE TO TRAVEL WITHIN A PARTICULAR AREA filed on the same date as the present patent application.

FIELD OF THE INVENTION

The present invention generally relates to providing incentive to travel within a particular area, and more particularly to a method and apparatus for using "breadcrumbs" to provide an incentive to travel within the particular area.

BACKGROUND OF THE INVENTION

Patrol officers can have, "downtime" in between assigned calls where they have an opportunity to be proactive in detecting crime. During this downtime, the officers will often drive by high-crime areas. Since simply driving around high-crime areas can be perceived as tedious or boring, oftentimes driving by these areas is neglected. However, it is proven that when high-crime areas are patrolled effectively, there is a decrease in crime rate within that area. Since patrol officers often choose their own areas to patrol during downtime, a need exists for a method and apparatus for providing an incentive to travel within certain areas so that crime rates can be reduced.

BRIEF DESCRIPTION OF THE SEVERAL VIEWS OF THE DRAWINGS

The accompanying figures where like reference numerals refer to identical or functionally similar elements throughout the separate views, and which together with the detailed description below are incorporated in and form part of the specification, serve to further illustrate various embodiments and to explain various principles and advantages all in accordance with the present invention.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. It will further be appreciated that certain actions and/or steps may be described or depicted in a particular order of occurrence while those skilled in the art will understand that such specificity with respect to sequence is not actually required.

DETAILED DESCRIPTION

In order to address the above mentioned need, a method and apparatus for providing an incentive to an officer to travel through a particular area is provide herein. During operation a device will provide an officer with a map of their patrol area. Along with the map, various roads and/or paths will have "breadcrumbs" shown on them. These breadcrumbs will be "picked up" (disappear) when an officer travels over or near them.

The above provides for a system and user interface to incentivize the officer through designated areas with a patrol zone. The breadcrumbs may be placed based on recent crime data. The user interface will lay down crime-based "breadcrumbs" to signify to the officer a system-determined need to patrol down certain roads and check certain locations. Once the officer has driven past the designated roads (determined via GPS), the breadcrumbs disappear from the displayed map.

Throughout the officer's shift, the breadcrumbs may regenerate at different rates/intervals based on historic crime activity and/or commander-designated regeneration times for a particular area. These areas may also be assigned a priority (for example, by having different types of breadcrumbs) and determine how many times during a shift the user should patrol these routes and particular areas. For example, a first breadcrumb may regenerate after a first time period (e.g., 1 hour) and a second breadcrumb may regenerate after a second time period (e.g., 2 hours), while a third breadcrumb may not regenerate at all. The regeneration rates are such that higher crime areas have a quicker regeneration rate.

A number of times to patrol an area during shift may be indicated via a numerical value in/on the breadcrumbs that decrement each time officer patrols route. Additionally or alternatively, higher priority areas or areas with higher numerical patrol requirements may be drawn as larger breadcrumbs or as darker/different color breadcrumbs.

Regeneration rates can also take into account time of day, day of the week, as well as how many times other patrol officers have checked the area earlier in the day, and vary the regeneration rate for the current officer's shift. An audible sound may be provided to the officer when a breadcrumb is regenerated, or a new breadcrumb is added.

Determining an area to incentivize by dropping breadcrumbs within the area (i.e., provide someone with an incentive for traveling within the area by dropping breadcrumbs within the area) may be as simple as determining a patrol area assigned to an officer and dropping breadcrumbs on all streets/paths/buildings within the patrol area. This will provide the officer with incentive to travel down every street within their assigned area at least once.

If high-crime areas are to be incentivized, an algorithm that processes historical incident data to create a heat map of incident hot spots may be utilized to determine the area to incentivize. Incidents may comprise any event that is desired to be viewed or prevented by the officer. For example, incident hot spots may comprise crime hot spots, or traffic accident hot spots, . . . , etc.

The creation of a heat map may be accomplished via a standard software package such as The Omega Group's CrimeView® desktop crime analysis and mapping solution. This incident data heat map is used to identify the parts of a city, building, or other areas that have a high probability of future incidents (with the assumption that past incident data is an indicator of likely future incidents of a similar type). The parts of a city, building, or other areas may be incentivized by dropping breadcrumbs along roads and pathways that travel through the parts of the city, building, or other areas identified as a hot spot.

The incident heat map may vary depending on time of day, time of year, and environmental factors such as weather conditions and the like. Armed with the knowledge of where, when, and under what conditions future incidents are likely to occur, the locations of increased incident activity within the heat map are correlated with the incentivized area provided to a given officer. An Incentivized area is then constructed over some time period (i.e., a shift), such that for a given time, date, and environmental conditions, areas with increased incident activity are more frequently observed by the officer because they are incentivized with breadcrumbs placed in those areas. Incident hot spots may be recalculated after a predetermined period of time, for example, on an hourly, daily, weekly, or monthly schedule.

Dropping breadcrumbs as described above will incentivize travel through an area, providing an improved chance of observing future incidents by the officer (or deterring incidents from happening in the first place). For example, Bar A (in the Eastern portion of a officer's patrol area) closes at 2 AM each night and historical incident data indicate a significant increase in the rate of assault and battery cases in the vicinity between 2 to 3 AM on Fridays and Saturdays. Bar B (in the Western portion of the officer's patrol area) closes at 3 AM each night and historical incident data indicate a similar increase in crime in the vicinity between 3 to 4 AM on Fridays and Saturdays. Using this information, an incentivized area may be determined for the officer. In this example, the officer's Incentivized area may cause the officer to pass by of Bar A from 2 to 3 AM and to pass by Bar B from 3 to 4 AM on Fridays and Saturdays.

It should be noted that the above technique does not provide a particular route to the officer. Instead, certain areas are incentivized by dropping breadcrumbs in the area on roads/paths that may be travelled by the officer. The breadcrumbs may be picked up by traveling any number of routes through the area, by, for example traveling within a certain distance (e.g., 10 feet) of the bread crumb. It should also be noted that multiple officer's locations can be tracked and the breadcrumbs may be picked up when any officer travels near them. Thus, there could be two or more officers patrolling the area and both will be incentivized as described above.

If the historical incident data shows additional correlation beyond date, time, or season to more complex environmental factors such as weather patterns, moon phase, etc., a more dynamic Incentivized area can be constructed accordingly. For example, historical incident data may indicate a higher incidence of traffic accidents at a particular intersection on rainy nights. As such, if a weather forecast calls for rain during the nighttime hours, the officer's Incentivized area could be automatically updated to incentivize travelling near the intersection in question. This update may happen in advance based on a weather forecast, or it may happen automatically upon detection of rainfall.

Prior to describing the system shown for accomplishing the above, the following definitions are provided to set the necessary background for utilization of the present invention.

Incident Heat Map: A map generated by analyzing historical Incident data indicating the relative density of incidents across a geographical area. Areas with a higher density of incidents are typically referred to as 'hot' (and often visually displayed with shades of red) and areas with low incident density are referred to as 'cold' (and often visually displayed with shades of blue). Prior to rendering an incident heat map, the incident data may be filtered based on any number of attributes. For example, circuitry could build an incident heat map depicting only violent crime over the past month.

Incident Data—A record of incidents. typically, at a minimum, the location, type, severity, and date/time attributes of the incident are recorded. Additional environmental factors may also be recorded (e.g., the weather at the time of the incident, etc). Examples of incident data include, for example, crime data, traffic accident data, weather phenomena, and/or individual schedules (e.g., a mayor's schedule).

Breadcrumbs—Any digital object (dot, square, circle, shape, . . . , etc.) that is placed on or near a digital road or pathway, or structure that may be travelled by an officer within a vehicle or on foot. For example, a dot may be place on a road, and displayed on a digital map provided to the officer. Once an officer travels over the dot, the dot may disappear. The purpose of these dots is to indicate areas that need to be patrolled.

Officer Patrol area—The spatial area that a given officer is assigned to patrol.

Incentivized Area—An area, that may be part of the officer-patrol area that is incentivized by placing breadcrumbs on roads and paths that exist within the incentivized area. The incentive for traveling within the area is created by the officer desiring to pick up the breadcrumbs within the area. The incentivized area may be a portion of the officer patrol area.

In a further embodiment of the present invention, a point value may be given to an officer every time a breadcrumb is picked up. An officer's point total can be determined and incentives may be provided to those officers with consistently high point totals. For example, if both officer Smith and officer Jones are provided with 1000 breadcrumbs during a shift, and officer Smith consistently picks up an average of 700 breadcrumbs per shift, while officer Jones only picks up an average of 300 breadcrumbs per shift, officer Smith may be awarded with a better performance review, merit award, incentive pay, . . . , etc. In addition, a merit award system may be employed where an officer's bonus may be based on how many breadcrumbs were picked up during a period of time.

Figure 1:
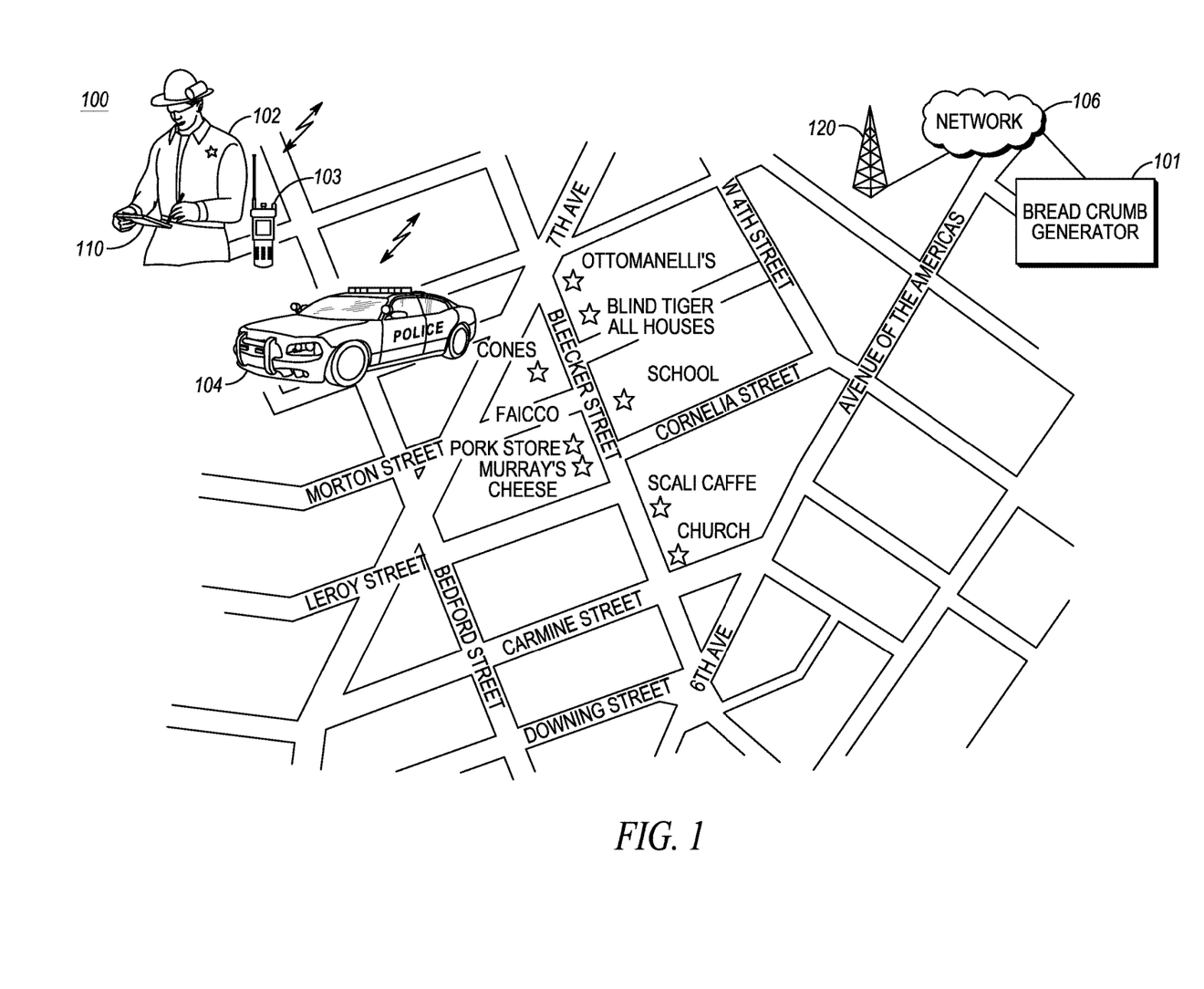
FIG. 1 illustrates a general operating environment.

Turning now to the drawings wherein like numerals designate like components, FIG. 1 is a block diagram showing a general operational environment 100 for employment of the present invention. Environment 100 may comprise an area assigned to officer 102 for patrolling. Patrolling may take place with officer 102 driving public-safety vehicle 104 (in this example, an automobile) through area 100.

Devices 103 and 110 are in communication with dispatch center 101 (serving as breadcrumb generator 101) through intervening network 106.

Public-safety vehicle 104 may comprise such vehicles as a bicycle, automobile, rescue vehicles, ladder trucks, ambulances, police cars, fire engines, . . . , etc. Vehicle 104 may be equipped with communication equipment that allows communication over network 106. Devices 103, 110 can be any portable electronic device including but not limited to a standalone display or monitor, a handheld computer, a tablet computer, a mobile phone, a police radio, a media player, a personal digital assistant (PDA), a GPS receiver, or the like, including a combination of two or more of these items.

Network 106 may comprise one of any number of over-the-air or wired networks. For example network 106 may comprise a private 802.11 network set up by a building operator, a next-generation cellular communications network operated by a cellular service provider, or any public-safety network such as an APCO 25 network. Network 106 usually comprises several base station 120 that can receive information (either control or media, e.g., data, voice (audio), video, etc.) in a signal from vehicle 104 and devices 103, 110. Base station 120 can also transmit information in signals to one or more vehicles 104 and/or device 103, 110.

Area 100 may be depicted/displayed on devices 103, 110 (or any other device associated with officer 102) along with a current location of officer 102 (as determined by any device associated with officer 102). The actual content displayed on devices 103, 110 may be similar to that shown in FIG. 2.

Figure 2:
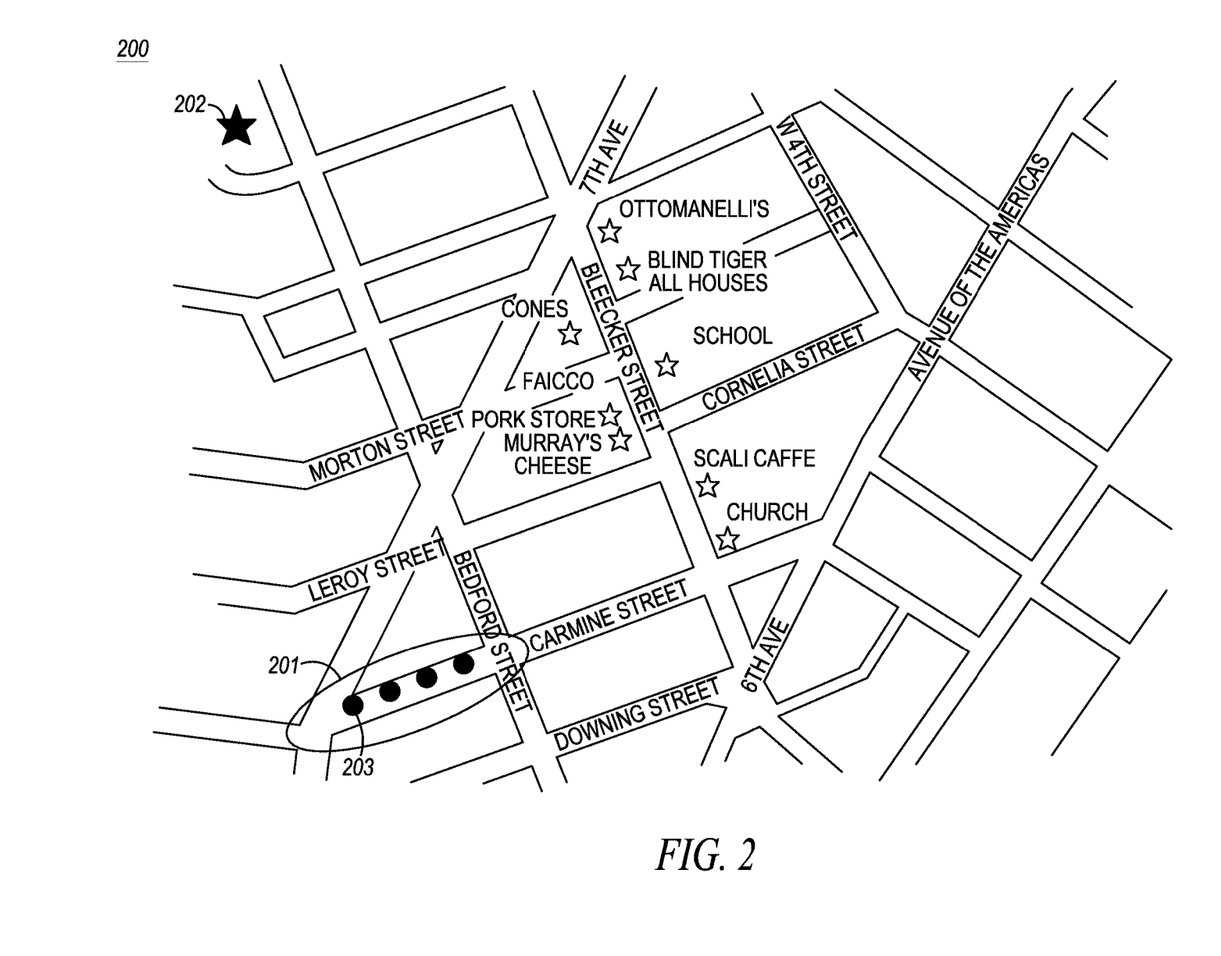
FIG. 2 illustrates a graphical-user interface displaying a map with breadcrumbs.

As shown in FIG. 2, location 202 of officer 102 is illustrated, along with a street map, preferably showing the officer's patrol area. As discussed above, there may exist areas in which one may want to incentivize officer 102 to patrol more frequently. For example, area 201 may have been identified as having a higher incidence of crime. In order to incentivize officer 102 to travel through area 201, breadcrumbs 203 may be placed on roads/paths through area 201. When officer 102 travels to within a predetermined distance of any breadcrumb, the breadcrumb will be removed from display 200. This is illustrated in FIG. 3.

Figure 3:
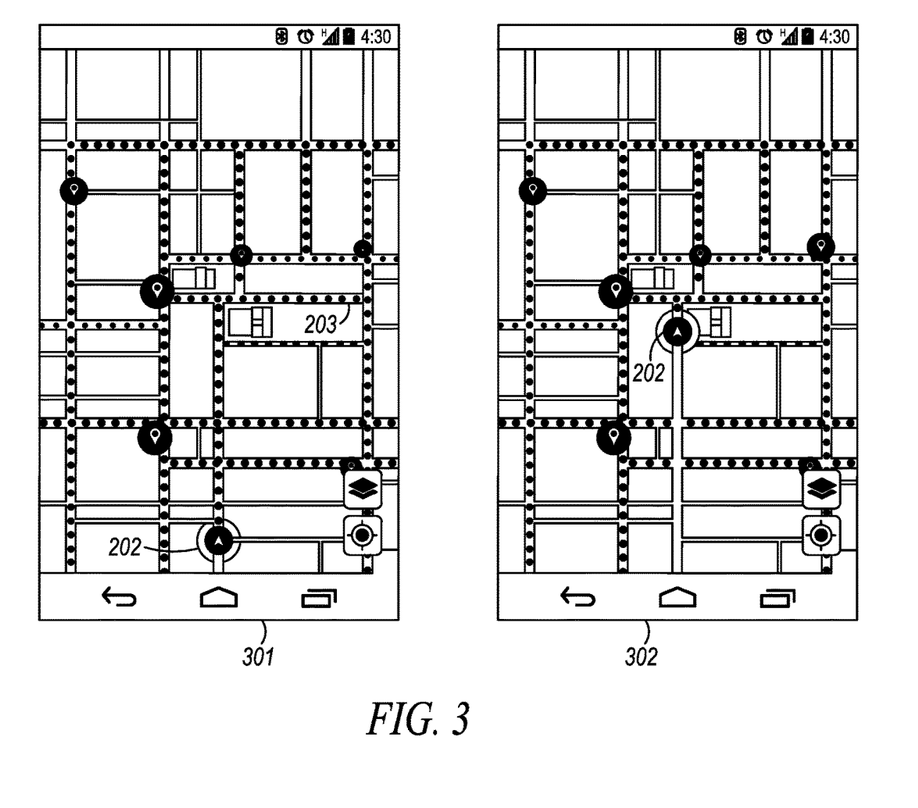
FIG. 3 illustrates breadcrumbs picked up as an officer travels near them.

As shown in FIG. 3, screen 301 shows location 202 of officer 102 at a first point in time traveling on an unlabeled road. As is evident, there exists a plurality of breadcrumbs 203 (only one labeled) on various roads. Screen 302 shows location 202 of officer 102 at a second point in time, having traveled near/over various breadcrumbs. As is evident, the breadcrumbs that were traveled over/near have been removed from screen 302.

As discussed above, the removed breadcrumbs may regenerate. The regeneration rate may be based on historic crime activity and/or commander-designated regeneration times for that area 201. More than one area 201 may exist and these areas may also be assigned a priority (for example, by having different types of breadcrumbs) and determine how many times during a shift the user should patrol these routes and Focus Areas.

A number of times to patrol an area during shift may be indicated via a numerical indicator (not shown) in, or near the breadcrumbs that decrement each time officer patrols route and dots temporarily disappear. Additionally or alternatively, higher priority areas or areas with higher numerical patrol requirements may be drawn as larger breadcrumbs or as shaded/different color breadcrumbs.

Regeneration rates can also take into account time of day, day of the week, as well as how many times other patrol officers have checked the area earlier in the day, and vary the regeneration rate for the current officer's shift. An audible sound may be provided to the officer when a breadcrumb is regenerated, or a new breadcrumb is added.

Figure 4:
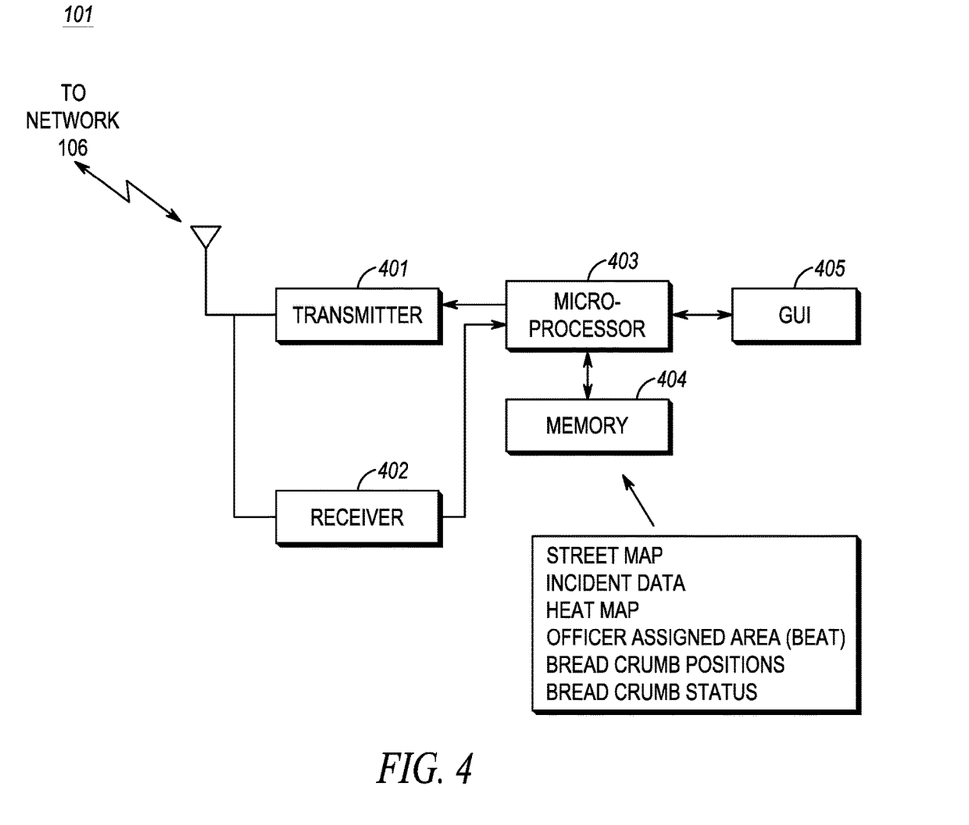
FIG. 4 is a block diagram of a breadcrumb generator.

FIG. 4 is a block diagram of a breadcrumb generator 101. As discussed above, breadcrumb generator may exist as a stand-alone piece of hardware, or alternatively, as part of a dispatch center. As shown, generator 101 may include transmitter 401, receiver 402, graphical-user interface (GUI) 405, logic circuitry 403, and memory 404. In other implementations, generator 101 may include more, fewer, or different components.

Transmitter 401 and receiver 402 are preferably wireless, and may be long-range and/or short-range transceivers that utilize a private 802.11 network set up by a building operator, a next-generation cellular communications network operated by a cellular service provider, or any public-safety network such as an APCO 25 network or the FirstNet broadband network. Transmitter 401 and receiver 402 may also contain multiple transmitters and receivers, to support multiple communications protocols simultaneously.

GUI 405 may include a device that can display maps and breadcrumbs as images on a screen (e.g., a liquid crystal display (LCD), organic light-emitting diode (OLED) display, surface-conduction electro-emitter display (SED), plasma display, field emission display (FED), bistable display, projection display, laser projection, holographic display, etc.).

Logic circuitry 403 comprises a digital signal processor (DSP), general purpose microprocessor, a programmable logic device, or application specific integrated circuit (ASIC) and is utilized to generate breadcrumbs and transmit them to an officer's device Memory 404 comprises standard random-access memory, and is used to store information such as, but not limited to maps, incident data, heat maps, officer assigned areas, bread crumb positions, breadcrumb status (picked up or not), . . . , etc.

The device shown in FIG. 4 provides for an apparatus comprising a microprocessor that determines an area having an incident of interest most likely to occur, and determines an area assigned to an officer to patrol. A transmitter is provided for transmitting electronic breadcrumbs to the officer. As discussed above, the electronic breadcrumbs are placed on an electronic map within the area assigned to the officer to patrol, and the electronic breadcrumbs disappear from the electronic map when the officer travels near the electronic breadcrumbs. Additionally, the area having the incident of interest most likely to occur is determined by analyzing data of past incidents, and generating an incident heat map.

Figure 5:
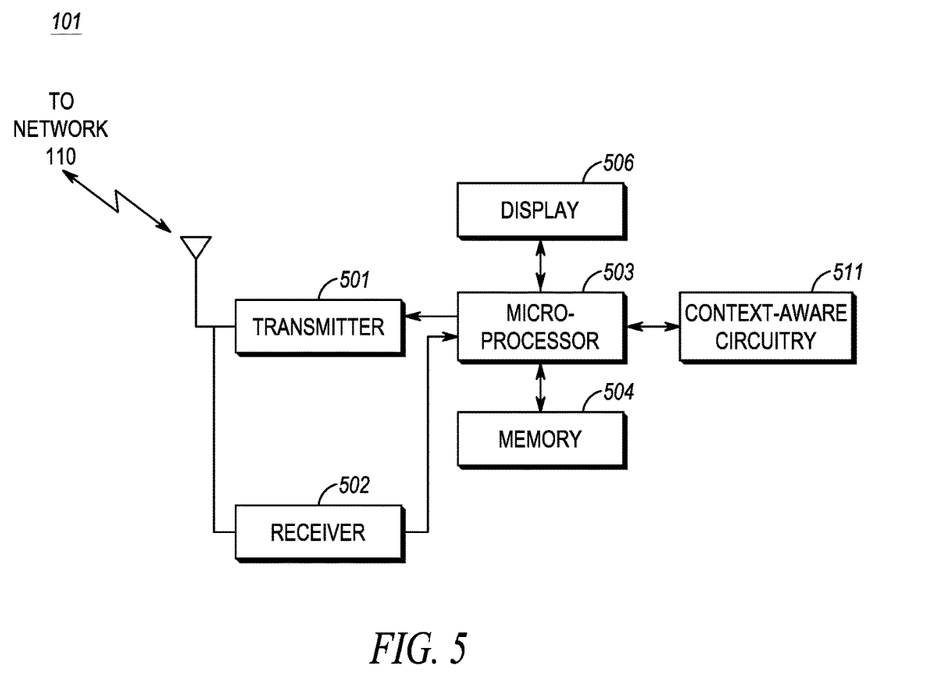
FIG. 5 is a block diagram of a display device.

FIG. 5 is a block diagram of a display device, for example, device 103 or 110. As shown, the device may include transmitter 501, receiver 502, display 506, logic circuitry 503, memory 504, and context-aware circuitry 511. In other implementations, the device may include more, fewer, or different components.

Transmitter 501 and receiver 502 may be well known long-range and/or short-range transceivers that utilize a private 802.11 network set up by a building operator, a next-generation cellular communications network operated by a cellular service provider, or any public-safety network such as an APCO 25 network or the FirstNet broadband network. Transmitter 501 and receiver 502 may also contain multiple transmitters and receivers, to support multiple communications protocols simultaneously.

Display 506 may include a device that can display images/video generated by camera 202 as images on a screen (e.g., a liquid crystal display (LCD), organic light-emitting diode (OLED) display, surface-conduction electro-emitter display (SED), plasma display, field emission display (FED), bistable display, projection display, laser projection, holographic display, etc.). In a similar manner, display 506 displays maps and breadcrumbs as discussed.

Logic circuitry 403 comprises a digital signal processor (DSP), general purpose microprocessor, a programmable logic device, or application specific integrated circuit (ASIC) and is utilized to receive breadcrumbs and cause them to be displayed and picked up as described herein.

Context-aware circuitry 511 may comprise any device capable of generating an estimated location for the device.

For example, context-aware circuitry 511 may comprise a GPS receiver capable of determining a geographic location.

The device shown in FIG. 5 provided for a receiver receiving locations for electronic breadcrumbs, wherein the electronic breadcrumbs are placed on an electronic map within an area assigned to an officer to patrol, and the electronic breadcrumbs disappear from the electronic map when the officer travels near the electronic breadcrumbs. A graphical-user interface is provided for displaying the breadcrumbs on the electronic map, and location-finding circuitry is provided for determining a location of the device. A microprocessor is provided for determining that the location of the device is within a predetermined distance from a breadcrumb and removing the breadcrumb from the graphical user interface.

Figure 6:
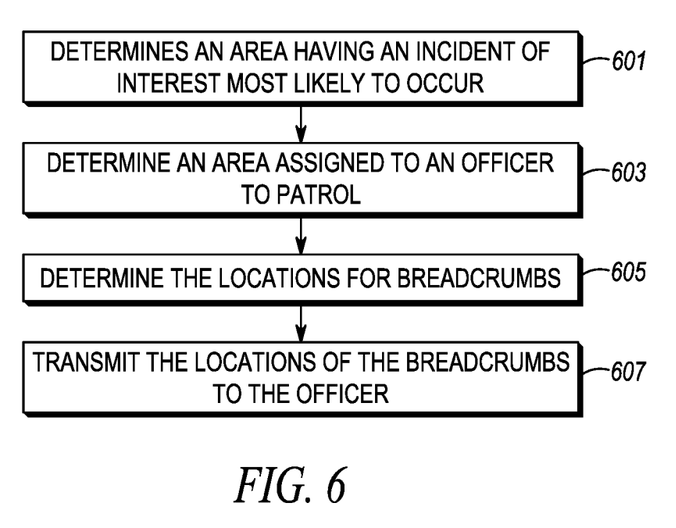
FIG. 6 is a flow chart showing operation of the breadcrumb generator of FIG. 4.

FIG. 6 is a flow chart showing operation of the breadcrumb generator of FIG. 4. More particularly, FIG. 6 shows those steps (not all of which are necessary) for incentivizing an officer to travel within a particular area. The logic flow begins at step 601 where microprocessor 403 determines an area having an incident of interest most likely to occur. As discussed above, this determination may be based on a crime heat map, which may be stored in memory 404. In an alternate embodiment of the present invention, logic circuitry 403 may generate the crime heat map, or simply determine high-crime areas by analyzing incident data stored in memory 404.

At step 603 logic circuitry determines an area assigned to an officer to patrol. Patrol areas are preferably stored in memory 404 or alternatively may be provided to logic circuitry 403 via a user input via GUI 405. At step 605 logic circuitry 403 determines the locations for breadcrumbs. As discussed above, the locations for the bread crumbs are preferably within or near the area having the incident of interest most likely to occur. Finally, at step 607, logic circuitry 403 instructs transmitter 401 to transmit the locations of the breadcrumbs to the officer.

As discussed above, the electronic breadcrumbs are placed on an electronic map within the area assigned to the officer to patrol, and the electronic breadcrumbs disappear from the electronic map when the officer travels near the electronic breadcrumbs.

As discussed above, the step of determining where the incident is most likely to occur may comprise determining where a crime is most likely to occur by receiving historical crime data and determining the area having the crime most likely to occur based on the historical crime data.

Additionally, as discussed, logic circuitry 403 may determine that a predetermined period of time has passed and again use the transmitter to transmit more electronic breadcrumbs to the officer, where the electronic breadcrumbs are again placed on the electronic map within the area assigned to the officer to patrol.

Figure 7:
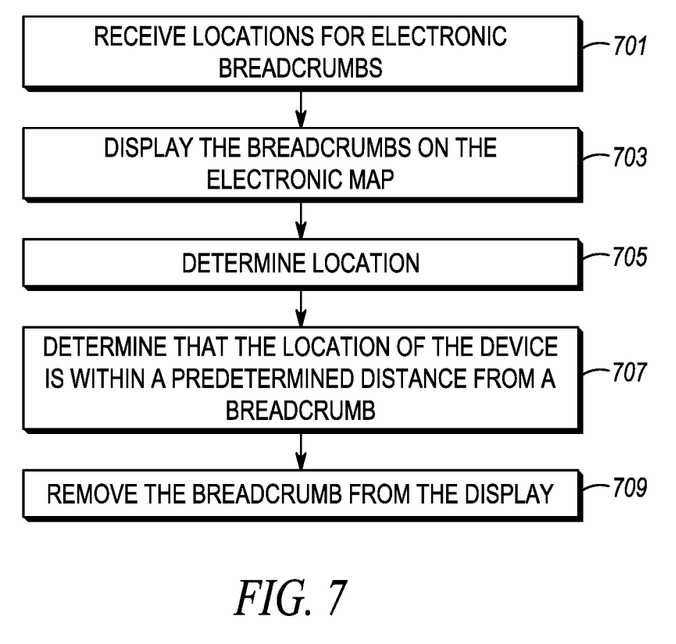
FIG. 7 is a flow chart showing operation of the display device of FIG. 5.

FIG. 7 is a flow chart showing operation of a device of FIG. 5. The logic flow begins at step 701 where receiver 502 receives locations for electronic breadcrumbs. The locations are passed to display 506 where display 506 displays the breadcrumbs on the electronic map (step 703). At step 705 location-finding circuitry 511 determines a location of the device and at step 707 microprocessor determines that the location of the device is within a predetermined distance from a breadcrumb. At step 709 logic circuitry 503 accesses display 506 and removes the breadcrumb from the display.

In the foregoing specification, specific embodiments have been described. However, one of ordinary skill in the art appreciates that various modifications and changes can be made without departing from the scope of the invention as set forth in the claims below. For example, whenever a breadcrumb is removed from a map, the device 103, 110 may convey this information to the breadcrumb generator via transmitter 501. The breadcrumb generator receives this information via receiver 402 and may store this information and use it in making determinations on whether or not to replace a particular breadcrumb. For example, instructions to regenerate a breadcrumb may not be given if the bread crumb has not been previously removed or passed by. Accordingly, the specification and figures are to be regarded in an illustrative rather than a restrictive sense, and all such modifications are intended to be included within the scope of present teachings.

Those skilled in the art will further recognize that references to specific implementation embodiments such as "circuitry" may equally be accomplished via either on general purpose computing apparatus (e.g., CPU) or specialized processing apparatus (e.g., DSP) executing software instructions stored in non-transitory computer-readable memory. It will also be understood that the terms and expressions used herein have the ordinary technical meaning as is accorded to such terms and expressions by persons skilled in the technical field as set forth above except where different specific meanings have otherwise been set forth herein.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method to regenerate electronic breadcrumbs, the method comprising the steps of:
   determining by a microprocessor, an area having an incident of interest most likely to occur;
   determining by the microprocessor, an area assigned to an officer to patrol;
   determining by the microprocessor, locations for electronic breadcrumbs;
   using a transmitter to transmit the locations of the electronic breadcrumbs to the officer, wherein the electronic breadcrumbs are placed on an electronic map at the locations, and within the area assigned to the officer to patrol, and the electronic breadcrumbs disappear from the electronic map when the officer travels near the electronic breadcrumbs;
   determining by the microprocessor a regeneration rate for a breadcrumb based on historic crime data, wherein regeneration rates for breadcrumbs are such that higher crime areas have a quicker regeneration rate than lower crime areas;
   wherein the microprocessor regenerates the electronic breadcrumbs after the regeneration rate for the breadcrumb; and
   using the transmitter to transmit the locations of the regenerated electronic breadcrumbs and;
      wherein breadcrumbs regenerate after a predetermined period of time, and wherein the predetermined period of time is based on the historic crime data.

2. The method of claim 1 wherein the step of determining the area having the incident of interest most likely to occur comprises the step of determining an area having a crime most likely to occur.

3. The method of claim 2 wherein the step of determining an area having a crime most likely to occur comprises the steps of:
   receiving historical crime data; and
   determining the area having the crime most likely to occur based on the historical crime data.

4. The method of claim 1 further comprising the steps of:
   determining that a predetermined period of time has passed; and
   again using the transmitter to transmit electronic breadcrumbs to the officer, wherein the electronic breadcrumbs are again placed on the electronic map within the area assigned to the officer to patrol.

5. The method of claim 1 wherein a numerical value exists on a breadcrumb, and wherein the numerical value represents a number of times the officer is to travel past the breadcrumb during a shift.

6. An apparatus comprising:
   a microprocessor determining an area having an incident of interest most likely to occur, determining an area assigned to an officer to patrol, and determining locations for electronic breadcrumbs;
   a transmitter, transmitting locations of the electronic breadcrumbs to the officer, wherein the electronic breadcrumbs are placed on an electronic map at the locations, and within the area assigned to the officer to patrol, and the electronic breadcrumbs disappear from the electronic map when the officer travels near the electronic breadcrumbs;
   determining by the microprocessor a regeneration rate for a breadcrumb based on historic crime data, wherein regeneration rates are such that higher crime areas have a quicker regeneration rate than lower crime areas;
   wherein the microprocessor regenerates the electronic breadcrumbs after the regeneration rate for the breadcrumb; and
   using the transmitter to transmit the locations of the regenerated electronic breadcrumbs,
      wherein breadcrumbs regenerate after a predetermined period of time, and wherein the predetermined period of time is based on the historic crime data.

7. The apparatus of claim 6 wherein the area having the incident of interest most likely to occur is determined by analyzing data of past incidents, and generating an incident heat map.

8. The apparatus of claim 7 wherein the area having a crime most likely to occur is based on the historical crime data.

9. The apparatus of claim 6 wherein a numerical value exists on a breadcrumb, and wherein the numerical value represents a number of times the officer is to travel past the breadcrumb during a shift.

* * * * *